United States Patent [19]
Xu et al.

[11] Patent Number: 6,091,952
[45] Date of Patent: *Jul. 18, 2000

[54] DISTRIBUTED SUBSCRIBER DATA MANAGEMENT IN WIRELESS NETWORKS FROM A CENTRAL PERSPECTIVE

[75] Inventors: Jian Ming Xu, Plano; Patrick N. Sollee, Richardson, both of Tex.; Adam E. T. Bryant, Benson, United Kingdom

[73] Assignee: Nortel Networks Corporation, Montreal, Canada

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/864,926

[22] Filed: May 29, 1997

Related U.S. Application Data

[63] Continuation-in-part of application No. 08/697,854, Aug. 30, 1996, abandoned.

[51] Int. Cl.⁷ ...................................................... H04Q 7/20
[52] U.S. Cl. ........................... 455/433; 455/435; 455/432
[58] Field of Search .................................. 455/422, 432, 455/435, 433, 436, 443, 444, 456

[56] References Cited

U.S. PATENT DOCUMENTS 4,876,735  10/1989  Selby ..................................... 455/435
5,054,110  10/1991  Comroe et al. .......................... 455/435
5,210,787   5/1993  Hayes et al. ............................ 455/432
5,442,683   8/1995  Hoogeveen ............................. 455/445
5,475,689  12/1995  Kay et al. ............................... 455/435
5,594,942   1/1997  Antic et al. ............................. 455/445
5,610,969   3/1997  McHenry et al. ....................... 455/435
5,629,975   5/1997  Tiedemann, Jr. et al. .............. 455/435
5,694,393  12/1997  Kaye ..................................... 455/33.1
5,819,178  10/1998  Cropper ................................. 455/433

OTHER PUBLICATIONS

Co–pending Application Serial No: 08/697,854, Aug. 30, 1996.
Co–pending Application Serial No: 08/864,927, May 29, 1997.

Primary Examiner—William G. Trost
Assistant Examiner—Jean Gelin
Attorney, Agent, or Firm—Felsman, Bradley, Vaden, Gunter & Dillon, LLP

[57] ABSTRACT

A system and method for increasing capacity of a cellular system by reducing call overhead processing and transmission congestion previously required in updating a subscriber's mobile station data position as the subscriber moves among locations within a geographic area served by a network service provider is presented. A predetermined N number of copies of mobile station subscriber data is distributed among multiple Visiting Location Registers (VLRs) within the area served by a cellular system. Unlike previous systems, when mobile stations traverse location boundaries, the current VLR corresponding to the current location does not need to update the subscriber data if that data has not changed since the subscriber was last in that location.

28 Claims, 5 Drawing Sheets

DISTRIBUTED SUBSCRIBER DATA MANAGEMENT IN WIRELESS NETWORKS FROM A CENTRAL PERSPECTIVE

This is a continuation-in-part of U.S. Ser. No. 08/697,854, filed Aug. 30, 1996 entitled "System And Method For Cellular Network Registration", now abandoned.

BACKGROUND OF THE INVENTION

1. Field of the Invention

The present invention relates generally to an apparatus and method for communications and particularly to cellular communications.

2. Description of the Related Art

Wireless radio telephone communication technology is well known and has existed for many years. The first true mobile telephone network was introduced in St. Louis, Mo. in 1946. The early mobile telephone systems immediately began experiencing many problems. From a subscriber viewpoint, the initial systems were very inconvenient, requiring much telephone system operator intervention, were relatively expensive and capacity was tiny by the standards of today. Mobility was also a problem.

Cellular telephony was introduced in the U.S. by way of the Advanced Mobile Phone Service (AMPS) during the 1970s and early 1980s. This system is based on FM analog speech transmission. Capacity is increased from previous systems due to frequency re-use among the many cells located within the system. Mobility is provided by the use of hand-off techniques implemented as a mobile station traverses a boundary between cells.

The Global System for Mobile (GSM) communications network was developed and first implemented in Europe in response to a need for even more capacity and compatibility among political and geographic territories. GSM is now an international standard.

GSM is a digital system which offers superior speech quality, low terminal, operational and service costs, an increased level of security (both privacy and fraud prevention), international roaming, support of low-power hand-held terminals and a variety of user services and features. An increase in capacity is achieved due to the use of digital signal processing techniques which allow for bandwidth reduction by elimination of variances inherent in human speech patterns in combination with the frequency re-use schemes of cellular systems.

When a subscriber's mobile station travels from one geographic area (cell, hence the name cellular) to another, the cellular system must track the mobile station movement in order to provide proper service to the subscriber. The cellular system must know where to send a call directed to the subscriber, and must be able to allow a call to continue as a mobile station travels from one cell to another without causing the subscriber the extreme annoyance of dropping the call.

Current mobile systems, including GSM, require a high volume of overhead processing and transmission in order to keep track of user location. Current systems keep track of mobile station location by storing a single permanent copy of a mobile station's identity and related data in a central location, which may be distant from the current location of the mobile station. That centrally stored mobile station data is then sent to the local geographic location of the mobile subscriber each time the mobile station roams to a new area. The mobile station data stored in the old area is then deleted as it is no longer needed. A large amount of processing and transmission resources are thus expended by the need to frequently access and update the mobile station data at the central location.

There exists a need to increase capacity of a network by reducing processing and network management transmission overhead by efficiently locating and tracking the mobile stations located within the boundaries of a cellular network without having to access the centrally stored mobile station data each and every time a mobile station powers up (attaches to the network) or roams from one cell to another, thus freeing up those limited resources to accommodate additional subscriber call volume.

SUMMARY OF THE INVENTION

In the broadest sense, our invention is directed to a system and method for increasing capacity of a cellular system by reducing call overhead processing and transmission congestion previously required in updating a subscriber's mobile station data position as the subscriber moves among cells within a geographic area served by a network service provider.

After a mobile station is switched on, it scans the GSM frequency band with a scanning algorithm in order to detect the presence of the network in the least amount of time. When the network is detected, the mobile station reads the system information on the base channel. With this information, the mobile station is able to determine its position in the network to within a predetermined local area. If the current location has changed since the mobile station was last switched off, a registration procedure takes place.

A predetermined N number of copies of mobile station subscriber data is distributed among multiple Visiting Location Registers (VLRs) within the area served by a cellular system. Unlike previous systems, when mobile stations traverse location boundaries, the current VLR corresponding to the current location does not need to update the subscriber data if that data has not changed since the subscriber was last in that location.

According to a preferred embodiment of the invention, a system and method for increasing capacity in a cellular communication system is provided including a central switching center operably connected to a public switched telephone network, a plurality of transceiver stations connected to the central switching center for communicating with a mobile station, and a registration processor connected to the central switching center including first and second registers with the method including receiving a location update request at the first register, if mobile station data has been stored in the first register then updating mobile station data stored in the second register to reflect current mobile station status, sorting the data stored in the second register based on most recent time of arrival, and returning an update location request successful acknowledgment to the first register.

It further includes a system and method for determining that if mobile station data has not been stored in the first register, then downloading mobile station data from the second register to the first register, storing the current mobile station data in the second register as an item in a list with an indication of most recent time of arrival, and sorting the mobile station data in the second register by most recent time of arrival.

The system and method further include the means for and method of removing the oldest item from the first and second registers if the number of items exceeds a predetermined number N.

Further features of the above-described invention will become apparent from the detailed description hereinafter.

The foregoing features together with certain other features described hereinafter enable the overall system to have properties differing not just by a matter of degree from any related art, but offering an order of magnitude more efficient use of limited processing and transmission resources.

Additional features and advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate preferred embodiments of the apparatus and method according to the invention and, together with the description, serve to explain the principles of the invention.

DETAILED DESCRIPTION

Figure 1:
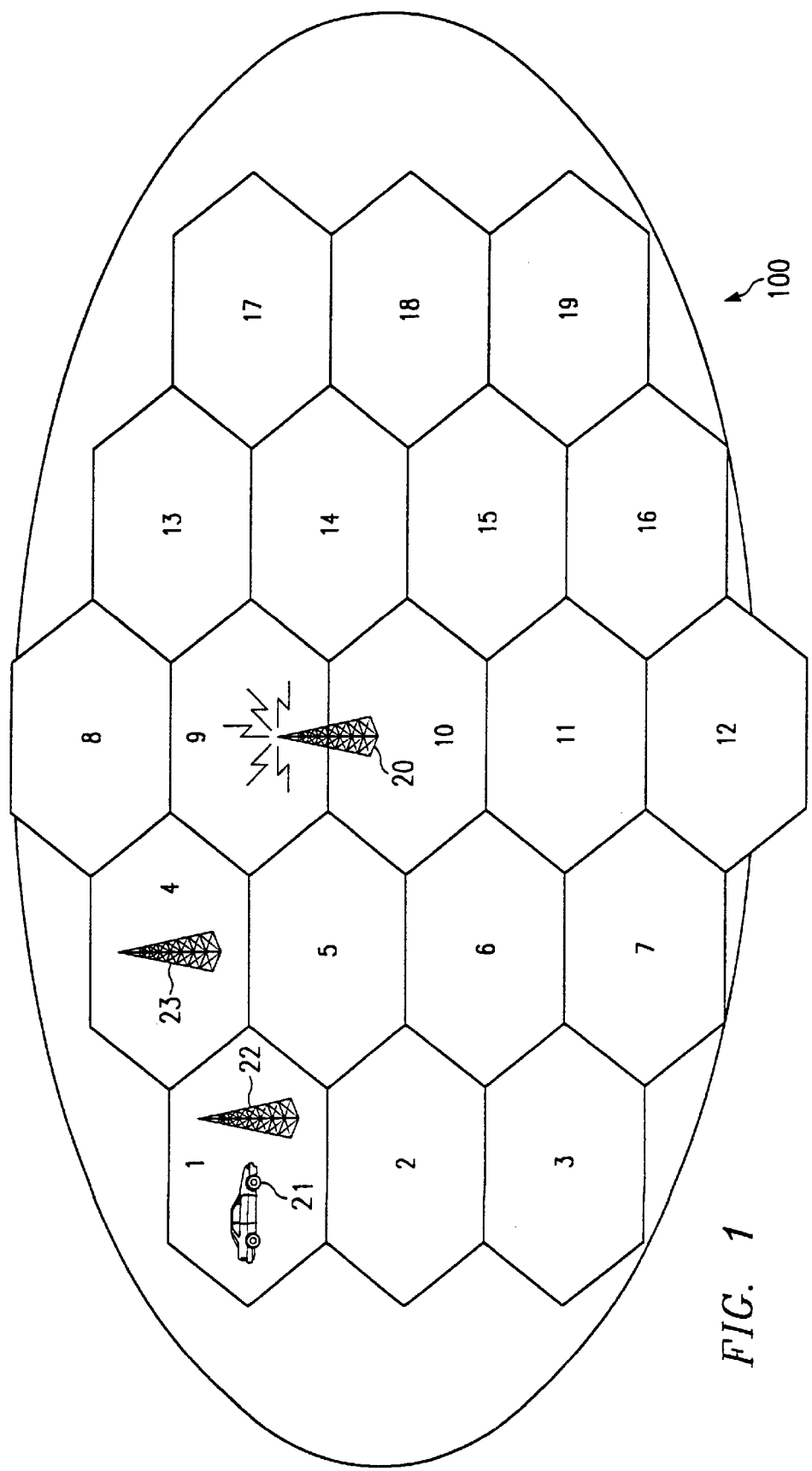
FIG. 1 illustrates a representation of the geography of a cellular network.

A general simplified diagram of the physical layout of a cellular system is illustrated in FIG. 1. Area 100 is subdivided into multiple cells 1–19 in this example. Each cell 1–19 has its own transceiver station 20 for communicating with mobile station 21. For simplicity not all transceivers and only one mobile station 20 are illustrated. Each cell can accommodate a finite number of mobile stations at a given time. When this finite limit is exceeded, no more mobile stations can be accommodated, resulting in frustration for the subscriber and in lost revenue for the network service provider(s).

Additionally, when a subscriber is participating in a call via the mobile station, the subscriber may travel from, for example cell 1 to cell 4. The ongoing call must be seamlessly handed off from transceiver 22 located in cell 1 to transceiver 23 located in cell 4. This hand-off must be accomplished so as not to be noticeable to the subscriber, but most importantly must not result in a dropped call. When a subscriber moves between local areas, the network must keep track of the subscriber's location. This mobility results in a substantial amount of overhead network signaling and processing. By reducing the amount of overhead activity required as per this invention, the capacity of a given cellular network may be increased.

Before delving into a detailed discussion of the invention, a listing of pertinent acronyms is presented for convenience in Table 1.

Table 1

Figures 2A, 2B:
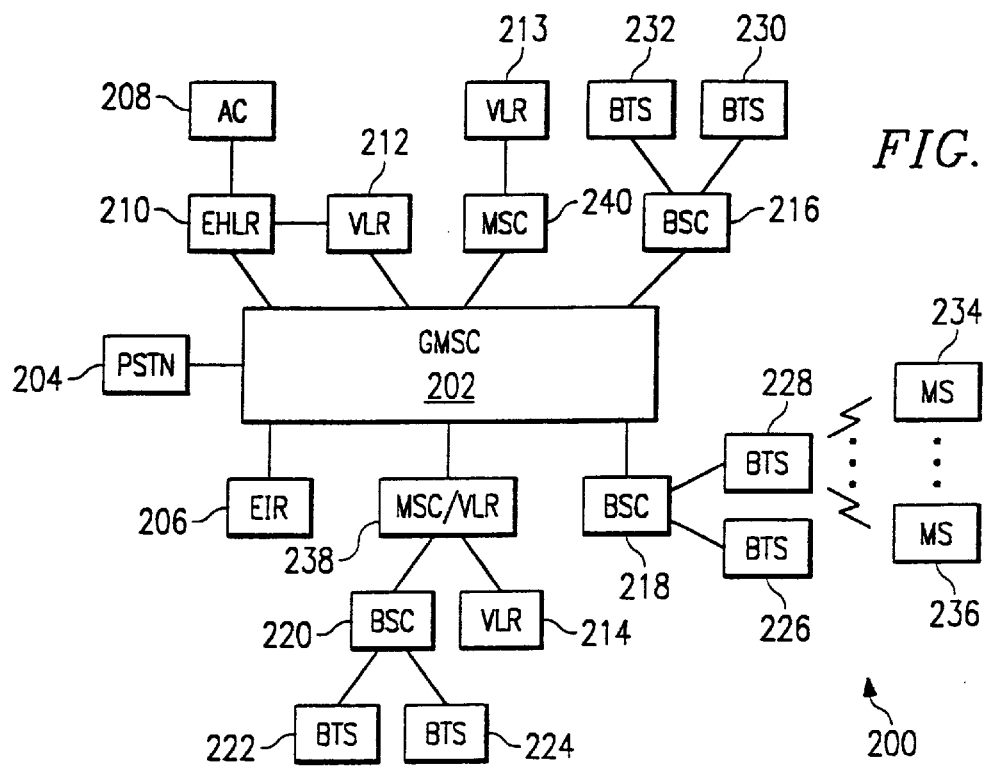
FIG. 2a illustrates a functional block diagram of a cellular network of the present invention.
FIG. 2b illustrates a tabular representation of an enhanced home location register of the present invention.

GSM Global System for Mobile Communications
HLR Home Location Register
EHLR Enhanced Home Location Register
VLR Visiting Location Register
MSC Mobile Switching Center
GMSC Gateway Mobile Switching Center
BSC Base Station Center
BTS Base Transceiver Station
MAP Mobile Application Part
ISD Insert Subscriber Data
UL Update Location
PSTN Public Switched Telephone Network An understanding of the system and method of operation of the invention may be obtained by now referring to FIG. 2a. The interconnection of the system will now be described briefly with a more thorough explanation of each major component to follow.

A preferred embodiment of the present invention operates within a Global System for Mobile (GSM) Communication cellular network 200. All descriptions will be provided with the GSM standard in mind. It is to be noted, however, that the present invention has many other applications and may be applied to any type of and/or combination of wireless communication systems including but not limited to PCS, paging, automated tracking, satellite, voice and data.

Cellular network 200 is connected via a connection from Gateway Mobile Switching Center (GMSC) 202 to Public Switched Telephone Network (PSTN) 204. PSTN 204 is the ubiquitous telephone network that has been around for years providing service to standard fixed users in their homes and businesses. GMSC 202 is the gateway from which all calls involving cellular subscribers to users not contained within the particular cellular network 200 must pass.

An Equipment Identity Register (EIR) 206 may be connected as a security feature to cellular network 200 through GMSC 202. It includes serial numbers of all equipment that is reported stolen and not allowed access to the network.

GMSC 202 is also connected to multiple base station controllers (BSC) 216–220 as well as other mobile switching centers (MSC) 238, 240. The BSCs in turn are connected to and control multiple Base Transceiver Stations (BTS) 222–232, respectively via hard-wired or microwave link. The BTSs are typically distributed one per cell and transmit/receive signals from mobile stations (MS) 234–236.

Connected to each GMSC 202 is an Enhanced Home Location Register (EHLR) 210 which contains a master data record pertaining to each mobile station 234–236, including location and status of the mobile station. EHLR 210 is accessed through the network 200 when a mobile station accesses the network or roams from one geographic region controlled by an MSC 238, 240 to another. Authorization Center (AC) 208 is connected to the EHLR to provide the EHLR with the capability of authenticating a mobile station as required.

A Visiting Location Register (VLR) 212–214 is connected to each MSC 238, 240 and for simplicity of method of network operation is also attached to GMSC 202. Each VLR acts as temporary storage for mobile station data while the mobile station is within the geographic area served by the appropriate MSC. Storage of mobile station data in VLRs serves to reduce some, but not all of the network overhead traffic required in a cellular network. A significant portion of the remaining network overhead traffic is addressed by the method and system of the present invention and will be addressed in subsequent discussions.

The best known part of the cellular network 200 is mobile station 234–236. Different types of mobile stations are distinguished by power and application. Fixed mobile stations are permanently installed in a car and may have a maximum allowed RF output power of up to 20W. Portable units including "bag phones" can emit up to 8W and hand-portable units may emit 2W or below. As hand-portable units decrease in size the popularity of cellular systems are correspondingly boosted.

The counterpart to mobile station 234–236 is base transceiver station (BTS) 222–232. The BTS is the mobile station's interface to the network. The BTS is usually located in the center of a cell (see FIG. 1) and has associated towers, antennas and usually from 1–16 transceivers (not shown). Each transceiver represents a single RF channel.

The Base Station Controller (BSC) 216–220 monitors and controls several BTSs 222–232, the number of BTSs varying upon the manufacturer and can range from several tens to several hundreds of BTSs. The primary tasks of the BSC are frequency administration, BTS control and exchange functions. The hardware of the BSC may be co-located with the BTS, at its own standalone site or co-located with MSC 238, 240 or GMSC 202. BSCs and BTSs may sometimes be referred to in the literature collectively as Base Station Subsystems (BSS).

Gateway Mobile Switching Center (GMSC) 202 is the interface of cellular network 200 with the Public Switched Telephone Network (PSTN) 200. It is a complete exchange and is capable of routing calls from the PSTN to the appropriate mobile station via the BSC and BTS. The GMSC also provides the cellular network with specific data about particular mobile stations. Depending on cellular network size, an operator might use several GMSCs or only one to interface to the PSTN. If the traffic within a cellular network requires more exchange capacity than the GMSCs can provide (which is typical) then additional Mobile Switching Centers (MSCs) 238, 240 are provided with no direct independent access to the PSTN. If not specifically differentiated, the capabilities of the GMSC and MSC are the same.

The Enhanced Home Location Register 210 of the present invention stores the identity and user data of all subscribers belonging to the area of the related GMSC 202 and nominally corresponds to the Home Location Register found in other cellular systems.

Typical user data includes such permanent data as the international mobile subscriber number (IMSI) of an individual subscriber, the subscriber's phone number from the PSTN, the authentication key for security purposes, the subscriber's permitted supplementary services such as caller ID, call waiting, call forwarding, voice mail, etc. followed by some temporary data. Temporary data is received from a removable Subscriber Identity Module (SIM) which is required for the operation of a mobile station. The SIM card identifies the user to the network and contains parameters unique to each subscriber and additional temporary data specific to current operation of the mobile station such as the address of the current Visitor Location Register (VLR) 212–214 (which is the subject of the following paragraphs), the number to which calls are to be forwarded (if allowed and activated) and transient security parameters for identification and ciphering.

Visitor Location Register (VLR) 212–214 contains the relevant data of all mobile stations currently located within the area of the serving (G)MSC. The permanent data is the same as found in EHLR 210; the temporary data differs slightly. For example, the VLR contains the temporary mobile subscriber information (TMSI) which is used in place of the IMSI during certain transmissions over the air interface. The use of the TMSI helps thwart the efforts of high-tech pirates who would intercept the IMSI in an attempt at mobile station cloning, a serious user fraud problem.

The VLR supports the (G)MSC during call establishment and authentication procedures by furnishing subscriber specific data. EHLR 210 provides the GMSC 202 with the address of the pertinent MSC when a call is being received from the PSTN by the mobile subscriber. The VLR serves a similar purpose, such as authentication, when a call is coming from the mobile station.

Authentication center (AC) 208 is related to the EHLR 210. It provides the EHLR with different sets of parameters to complete the authentication of a mobile station. Since all authentication processors are stored in the AC, abuse resulting in fraud is (hopefully) prevented. The data stored on the SIM card interacts with the output from the AC stored with either the EHLR or the HLR allowing authentication by either the EHLR or VLR.

Referring now to FIG. 2a, the data structure of Enhanced Home Location register (EHLR) 210 will be discussed. The EHLR is an N×M array 250, where M is the total number of subscribers in the network and N is a positive integer. Each subscriber is allocated a predetermined number N data elements in array 250. The N data elements correspond to the last N VLRs that have been tracking the subscriber mobile station as the user travels among cells.

One of the elegant aspects of the current invention will be appreciated upon the realization that the network does not have to obtain the subscriber data from the EHLR as the mobile station travels from one area to another if the current location area is listed within the last N local areas visited as maintained by the EHLR since the mobile station has been last authenticated. If the mobile station travels into a new location area, the network will send the authentication information and subscriber data to promptly update both the EHLR and local VLR to reflect the order of visited MSCs and VLRs. Upon the network resending the appropriate EHLR entry to the local VLR and then sorting the EHLR row, the oldest entry is discarded, if necessary.

The general method of operation of the system during registration will now be discussed. After a mobile station is switched on, it scans the GSM frequency band with a scanning algorithm in order to detect the presence of the network in the least amount of time. When the network is detected, the mobile station reads the system information on the base channel (other systems may call this the forward channel). With this information, the mobile station is able to determine its position in the network to within a predetermined local area. If the current location has changed since the mobile station was last switched off, a registration procedure takes place.

Figure 3:
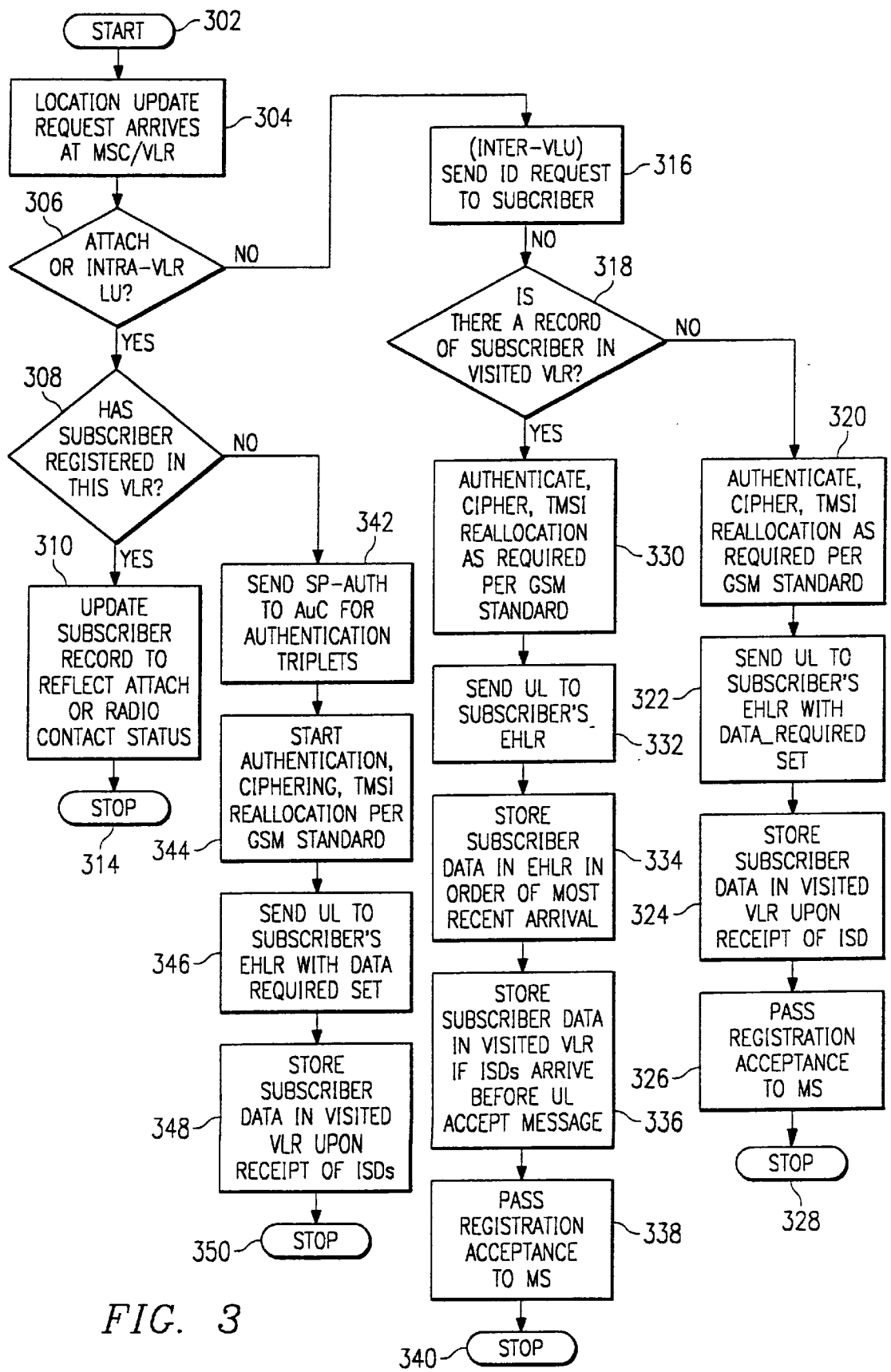
FIG. 3 illustrates a flow chart of the method for enhancing capacity by updating location locally in the present invention.

Specifically, referring now to FIG. 3 the method of operation by way of example will be discussed. The method of operation of registering at the VLR within a specific MSC begins in block 302. In block 304 the mobile subscriber sends an location update request to the specified VLR. It is then determined by step 306 whether the mobile is attaching or is coming from a location area within the same MSC. This is determined by comparing the data stored in the mobile itself with the data in the VLR. If the data is a match, then flow passes to step 308 where it is determined if the mobile unit is registered in the current VLR. If the mobile unit is registered in the VLR, then the EHLR need not be updated.

If step 306 returns a negative response to the attach or intra-VLR query, then an inter-VLR case is indicated with flow control passing to step 316. Step 318 determines whether there is an EHLR confirmed record of the mobile station in the local VLR. If no, then step 320 uses one authentication triplet for authentication and ciphering if an unused authentication triplet is available. Otherwise an authentication triplet is obtained from AC 208 via the network. The authentication, ciphering and TMSI allocation sequence is then begun in step 320 according to the GSM standard. Step 322 is detailed in FIG. 4 and involves the update location procedure at the EHLR and is equivalent to the procedure in 346. In step 324, the mobile station data is stored in the local VLR upon receipt of the ISD from the network. When the data storage of the previous step is acknowledged, the registration acceptance is passed to the MS as per step 326.

If the response in step 318 is yes, then step 330 uses one authentication triplet for authentication and ciphering if an unused authentication triplet is available. Otherwise an authentication triplet is obtained from AC 208 via the network. The authentication, ciphering and TMSI allocation sequence is then begun in step 330 according to the GSM standard. Step 332 is detailed in FIG. 4 and involves the update location procedure at the EHLR and is equivalent to the procedure in 346. When the data storage of the previous step is acknowledged, the registration acceptance is passed to the mobile subscriber (MS) as per step 338.

If it is determined in step 308 that the mobile unit has not registered in the VLR, then flow passes to step 342 where the authentication process involving the EHLR and AC begins in step 344.

In step 342, the network sends a request to authentication center 208 for authentication triplets per the GSM standard. In step 344, the authentication, ciphering and TMSI reallocation sequence is started within the network. An update location (UL) request is sent in step 346 to the mobile station's EHLR according to the method detailed in FIG. 4.

The received subscriber data is then stored in the local VLR upon receipt of the ISD in step 348. The storage of the data is verified and restored as necessary.

It should be noted that the extra step of storing mobile station data transmitted from the EHLR has been eliminated, thus also eliminating the network overhead involved in sending the now unneeded data.

It will be readily apparent that if an EHLR confirmed record of the mobile station exists, then the EHLR will eliminate the step of sending the subscriber's mobile station data over the network.

Figure 4:
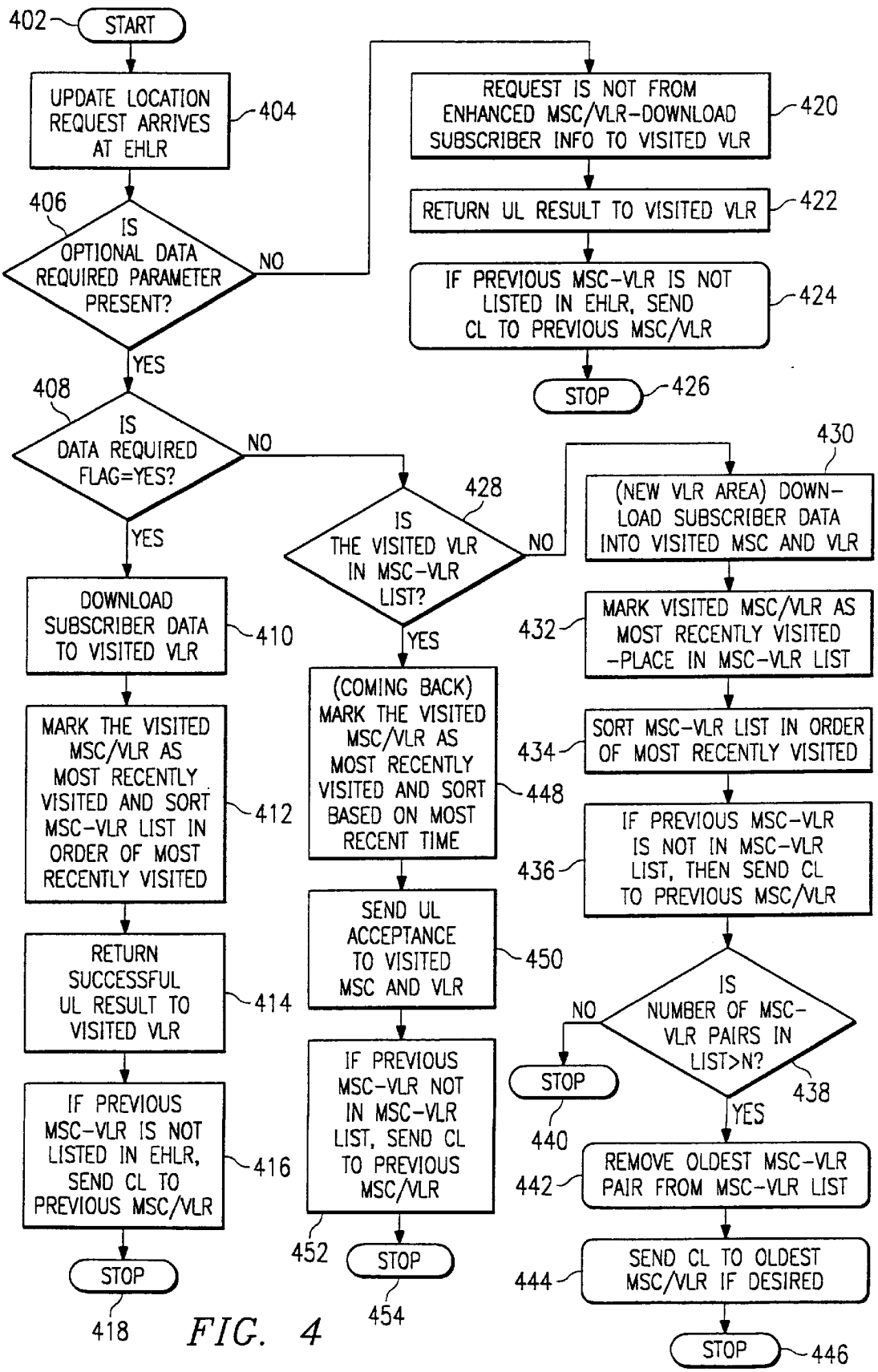
FIG. 4 illustrates a flow chart of the method for enhancing capacity by updating location centrally in the present invention.

The method of updating a location request at the EHLR will now be discussed with reference to FIG. 4. When a mobile subscriber moves from one region to another, the system must accommodate the movement seamlessly and transparently. Flow originates at step 402. At step 404 an update location (UL) request arrives from the an MSC at the EHLR. At step 406 the optional Data Required parameter is looked for. The presence of this parameter indicates that the enhancements of the instant invention at the MSC from the UL came may be taken advantage of at this point. If the parameter is absent, as is the case with earlier GSM versions, then the instant invention has the advantage of still being compatible with those versions.

In step 408 it is determined if the Data Required parameter is flagged. If so, then subscriber data is downloaded into the visited VLR in step 410 from the network. In step 412 the visited MSC/VLR is marked as the most recently visited and the MSC-VLR list in the EHLR is sorted chronologically in the order of most recently visited. In step 414 confirmation of the UL request is sent to the visited VLR if the request is successful. The request is repeated until a successful confirmation is received. If the previous MSC-VLR pair is not listed in the EHLR, then in step 416 a clear location (CL) message is sent to the previous MSC/VLR.

If the optional Data Required parameter is not present in step 406, then the request is handled as in previous GSM versions with the exception that a CL need not be sent if a previous VLR is in the list. In step 420 the subscriber information is downloaded from the EHLR through the network to the visited VLR if not in the visited VLR list and in step 424 the previous VLR is notified of the movement and purges its data concerning the mobile subscriber.

If the data required flag of step 408 is not set, then it is determined whether the visited VLR is currently listed in the EHLR in step 430. If not listed, then the mobile subscriber has moved into a new area. The subscriber data is downloaded from the EHLR into the visited VLR, the MSC-VLR list is updated in the EHLR and is marked as the most recently visited in step 432 for that mobile subscriber. In step 434, the MSC-VLR list is sorted in chronological order with the most recently visited area's VLR listed first.

If the previous MSC-VLR is not in the newly sorted list, then a CL request is sent to the previous MSC/VLR in step 436.

In step 438 the number of MSC-VLR pairs for the current subscriber is compared to the positive integer N. and if the number of pairs exceeds a certain predetermined number N, where N is an integer, then in step 442 the oldest MSC-VLR pair is removed and in step 444 a cancel location request is sent to the removed local VLR per the GSM standard.

N typically ranges from 2–4 in a preferred embodiment, but may range much further depending on network needs and operator preferences. Indeed, N may vary from subscriber to subscriber within the network and may be based on such factors as the typical weekday daily route of the mobile station, the weekend route, the time of day or any combination thereof. The current GSM standard is defaulted to for the value of N=1.

If in step 428 the visited MSC-VLR is present in the EHLR list, then the mobile subscriber is returning to a recently visited area. The MSC-VLR is marked as the most recently visited and the list is sorted chronologically based on time of arrival in step 448. In step 450, the UL acceptance is sent to the visited MSC/VLR. In step 452, a cancel location request is sent to the previous MSC/VLR if the MSC-VLR pair is not in the EHLR.

It may be seen that the capacity increase depends on the subscriber's mobile station mobility behavior, the amount of subscriber information and network configuration/topology. The range of capacity gains is approximately 30–50% of the existing Inter-VLR location update transactions cost at the MSC-VLR because of the re-use of authentication triplets which remain after other mobile stations move from the local VLR area and from the significant reduction of ISD and Cancel Location transactions which removes the mobile station data from a VLR immediately after the mobile station moves to a new area served by a different VLR.

Figure 5:
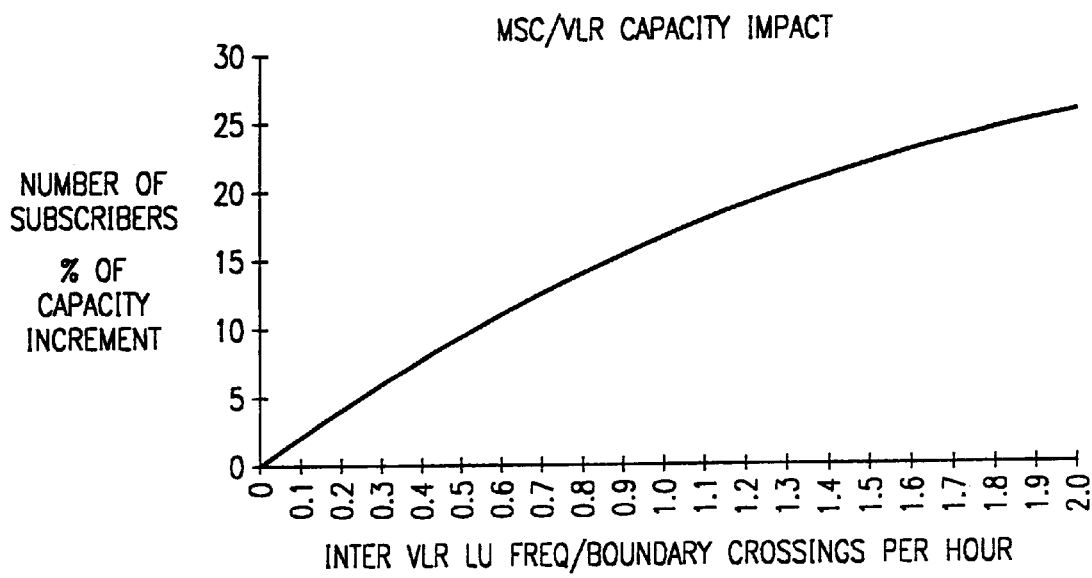
FIG. 5 illustrates graphically the improved capacity locally of the present invention.

FIG. 5 illustrates the typical overall gain in capacity at the MSC-VLR. As can be seen from the graph, the more boundary crossings per hour as shown on the ordinate (x axis) results in a larger percentage capacity increase on the abscissa (y axis). Some of the factors taken into consideration include a busy hour call attempts (BHCA) of 1.26 with a mobile call termination percentage of 53% and mobile call origination of 51%. There is also assumed a handover per call of 0.27 with an attach/detach rate of 0.27 and 0.03 respectively during the busy hour. Additionally there are 0.22 short messages during the busy hour.

The authentication and IMEI check frequency is set to 1 in 5 in all transactions other than the attach and inter-VLR LU operations, in which case the frequency is 1 in 1.

Figure 6:
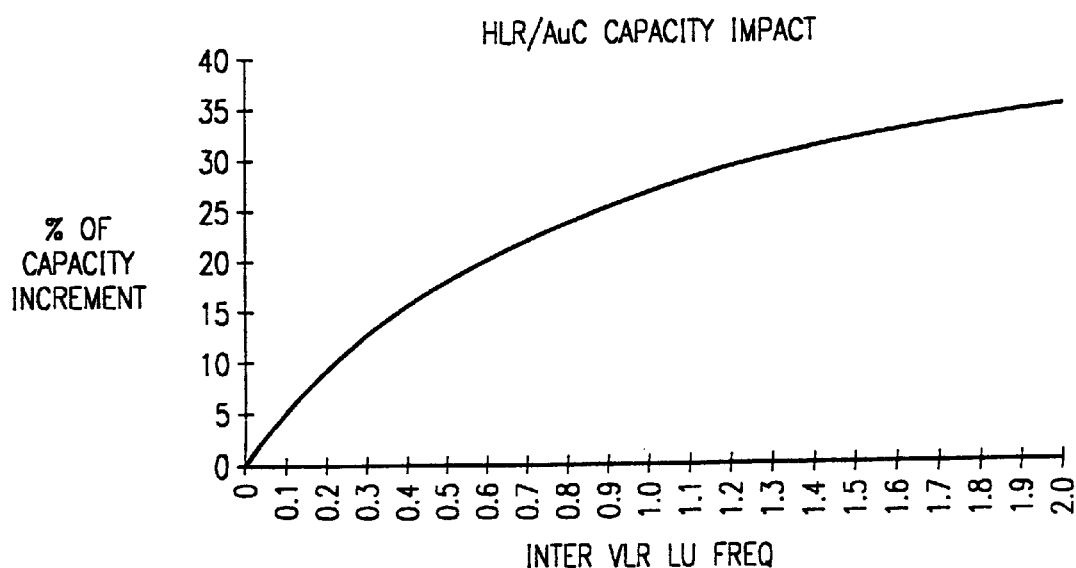
FIG. 6 illustrates graphically the improved capacity overall of the present invention.

The EHLR/Authorization Center capacity improvement is illustrated similarly in FIG. 6. The graphs also include the assumptions that there is a 100% hit ratio of existing subscriber mobile station data present in the previous local VLR area.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing registration of mobile stations in a cellular communication system including a central switching center operably connected to a public switched telephone network, a plurality of transceiver stations connected to the central switching center for communicating with said mobile stations, and a registration processor operably connected to the central switching center including a plurality of first registers and a second register, the method comprising the steps of:

receiving a location update request from a visited first register at said second register;

determining whether a data required parameter is included in said location update request;

if said data required parameter is included and if said received data required parameter indicates subscriber data is required at said visited first resister, downloading subscriber data to said visited first register; and, if said data required parameter is included and if said received data required parameter indicates subscriber data is not required at said visited first register, not downloading subscriber data to said visited first register.

2. The method of claim 1 further including the step of:

if said data required parameter is present and indicates data is required, modifying second register data to indicate said visited first register received data and sorting said second register data chronologically.

3. The method of claim 2 further including the steps of:

sending update location confirmation to said visited first register; and optionally sending a clear location request to a previous predetermined first register.

4. The method of claim 1 further including the step of:

modifying said second register data to update said visited first register received data if said second register contains data concerning said visited first register, and sorting said second register data chronologically if said data required parameter is present and indicates data is not required.

5. The method of claim 4 further including the steps of:

sending an update location acceptance to said visited first register; and optionally sending a clear location request to said previous predetermined first register.

6. The method of claim 4 further including the steps of:

sending subscriber data to said visited first register if said second register does not contain data concerning said visited first register and if said data required parameter is present and indicates data is not required; and sorting said second register data chronologically.

7. The method of claim 6 further including the step of sending a clear location request to said previous first register if said second register does not contain information concerning data concerning said previous first register.

8. The method of claim 7 further including the step of determining whether said second register data exceeds a predetermined threshold N, where N is a positive whole number of chronologically ordered data.

9. The method of claim 8 further including the step of removing the oldest chronologically ordered data from said second register when said predetermined threshold N is exceeded.

10. A cellular communication system comprising:

a gateway central switching controller operably connected to a public switched telephone network;

a plurality of central switching controllers operably connected to said gateway central switching controller;

a plurality of transceiver stations for communicating with a mobile station traveling among predetermined geographic areas, each transceiver station associated with one of said geographic areas and operably connected to one of said central switching controllers;

a registration processor, including a home location register, associated with the gateway central switching controller, for storing mobile station related data including a list of geographic areas visited by said mobile station;

a plurality of visitor location registers, each visitor location register corresponding to a particular one of said central switching controllers, for storing temporary mobile station data;

means for receiving a location update request from a visited visitor location register at said home location register;

means for downloading subscriber data to said visited visitor location register if a data required parameter is present and indicates data is required and modifying said home location register data to indicate said visited visitor location register received data and sorting said home location register data chronologically; and, means for modifying said home location register data to indicate said visited visitor location register received data and sorting said home location register data chronologically without downloading subscriber data to said visited visitor location register if said data required parameter indicates data is not required.

11. The cellular communication system of claim 10 further including:

means for sending update location confirmation to said visited visitor location register; and means for optionally sending a clear location request to a previous predetermined visitor location register.

12. The cellular communication system of claim 10 further including means for determining whether said home location register data exceeds a predetermined threshold N, where N is a positive whole number of chronologically ordered data.

13. The cellular communication system of claim 10 further including means for removing the oldest chronologically ordered data from said home location register when said predetermined threshold N is exceeded.

14. The method as claimed in claim 1, including the step of:

if said data required parameter is not included, then downloading subscriber data to said visited first register.

15. A method of managing registration of mobile stations in a cellular communication system including a central switching center operably connected to a public switched telephone network, a plurality of transceiver stations connected to the central switching center for communicating with said mobile stations, and a registration processor operably connected to the central switching center including a plurality of visitor location registers and a home location register, the method comprising the steps of:

maintaining in said home location register a list of visitor location registers visited by a mobile station;

receiving at said home location register a location update request from a visited visitor location register;

determining whether a data required parameter is included in said location update request;

downloading subscriber data from said home location register to said visited visitor location register if said data required parameter is present and indicates data is required; and, updating said list based upon said location update request.

16. The method as claimed in claim 15, including the step of:

if the data required parameter is not included, then downloading subscriber data from said home location register to said visited visitor location register.

17. The method as claimed in claim 16, including the step of:

sending update location results to said visited visitor location register.

18. The method as claimed in claim 17, including the steps of:

determining if a next previous visited visitor location register is in said list; and, sending a cancel location request to said next previous visited visitor location register.

19. The method of claim 15, wherein said step of updating said list includes the step of:

marking said visited visitor location register in said list as the most recently visited visitor location register and sorting said list chronologically.

20. The method as claimed in claim 19, including the further step of:

if said data required parameter is included in said location update request, determining if said visited visitor location register is in said list.

21. The method as claimed in claim 20, including the step of:

if said visited visitor location register is in said list, marking said visited visitor location register in said list as the most recently visited visitor location register; and, sorting said list chronologically.

22. The method as claimed in claim 20, including the steps of:

if said visited visitor location register is not in said list, downloading subscriber data from said home location register to said visited visitor location register;

marking said visited visitor location register in said list as the most recently visited visitor location register; and, sorting said list chronologically.

23. The method as claimed in claim 19, including the step of:

determining if said visited visitor location register is in said list.

24. The method as claimed in claim 23, including the step of:

if said visited visitor location register is in said list, marking said visited visitor location register in said list as the most recently visited visitor location register; and, sorting said list chronologically.

25. The method as claimed in claim 23, including the steps of:

if said visited visitor location register is not in said list, downloading subscriber data from said home location register to said visited visitor location register;

adding said visited visitor location register to said list;

marking said visited visitor location register in said list as the most recently visited visitor location register; and, sorting said list chronologically.

26. The method as claimed in claim 25, including the step of:

determining whether said list includes a number of visited visitor location registers greater than a predetermined a positive whole number N.

27. The method as claimed in claim 26, including the step of:

removing the oldest chronologically ordered visited visitor location register from said list when said number N is exceeded.

28. The method as claimed in claim 27, including the step of:

sending a clear location request from said home location register to said oldest chronologically ordered visited visitor location register.

* * * * *